Nov. 18, 1958 J. P. BARTON 2,860,764
BLOOM MANIPULATOR
Filed Aug. 17, 1956 2 Sheets-Sheet 1

INVENTOR:
JOHN P. BARTON,
BY: Donald G. Dalton
his Attorney.

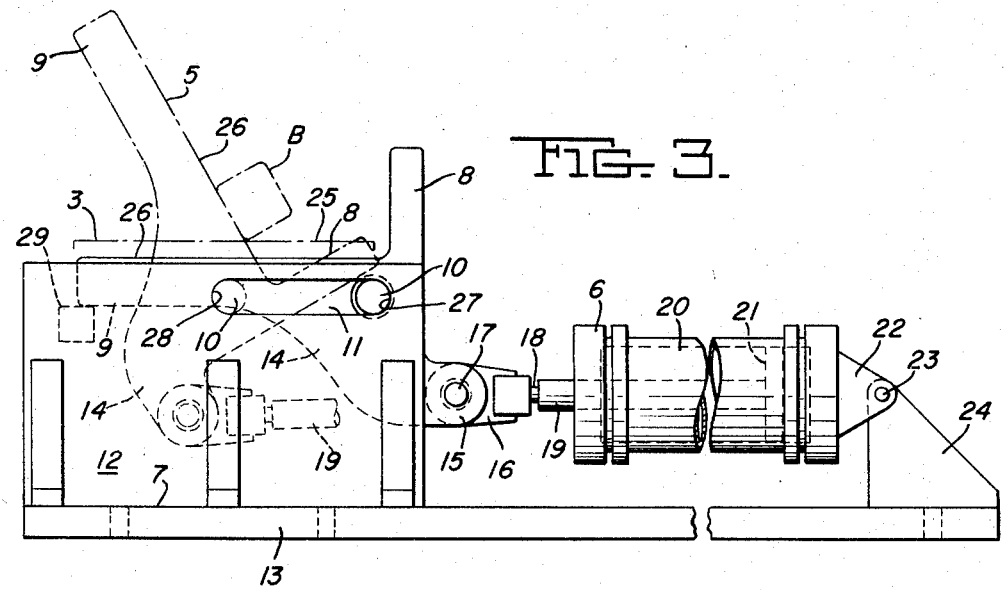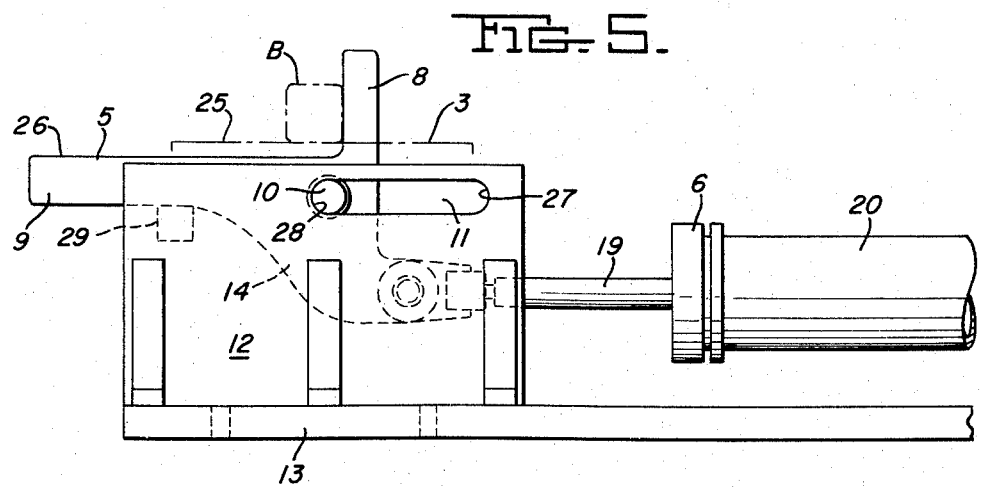

United States Patent Office 2,860,764
Patented Nov. 18, 1958

2,860,764
BLOOM MANIPULATOR

John P. Barton, Antioch, Calif., assignor to United States Steel Corporation, a corporation of New Jersey Application August 17, 1956, Serial No. 604,845

5 Claims. (Cl. 198—33)

This invention relates, as indicated, to a bloom manipulator and is directed to improvements which, in addition to turning a bloom, billet, bar, or work of other sizes and shape on a runout conveyor, provide for its emplacement on the conveyor in a centered position with respect thereto.

One of the principal objects of the invention is to provide a bloom manipulator which has a rugged construction, is comprised of a minimum of operating parts and will operate under adverse working conditions without failure. Generally stated, it is comprised of a turning member which is mounted for reciprocating movement over a rectilinear path extending transversely of a conveyor table from an inoperative position at one side of the table to an operative turning position centrally thereof. The mounting for the turning member includes a stop for arresting its rectilinear movement in its operative turning position and for providing a pivot about which it may be rotated to engage and tilt the work on the conveyor table. In a manner to be described, the turning member is actuated by a double acting fluid pressure motor which operates in one direction of action to both move it to its operative turning position and to rotate it about the pivot which is rendered operative in such position and, in an opposite direction of action, to return the turning member to its inoperative position.

Further objects and advantages of the invention will become apparent from the following description.

In the drawings there is shown a preferred embodiment of the invention. In this showing:

Figure 3 is an enlarged and detailed elevational view of the turning apparatus of this invention looking from the left of its showing in Figure 1;

Figure 5 is a view similar to Figure 3 but which shows the operating parts thereof in a different position.

Figure 1:
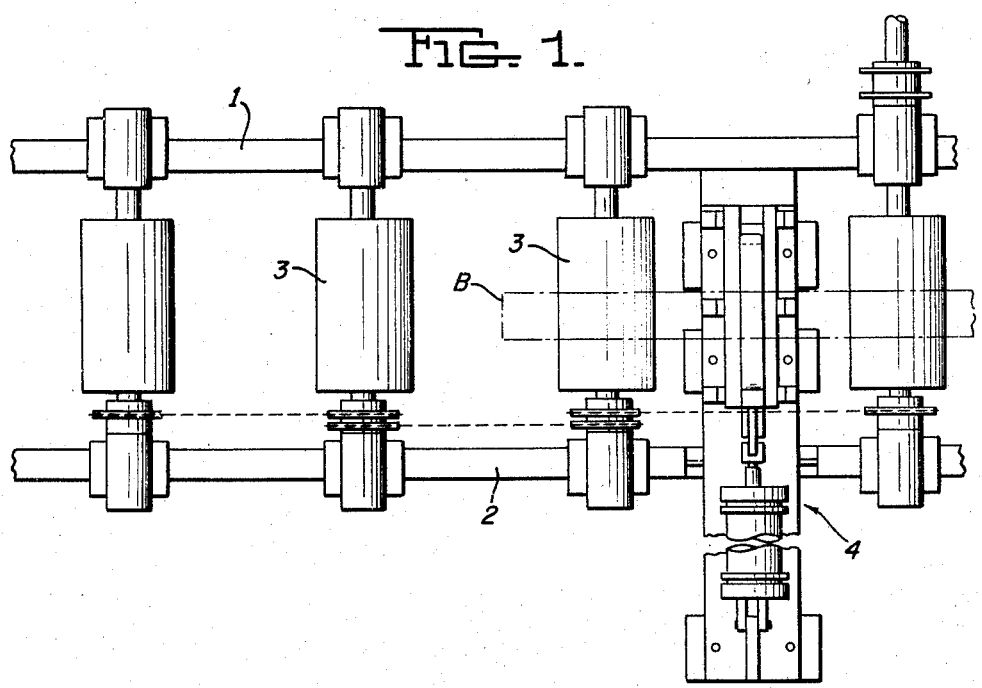
Figure 1 is a fragmentary plan view of a runout roller conveyor table which is provided with an article turning apparatus constructed in accordance with the principles of this invention.
Figure 2:
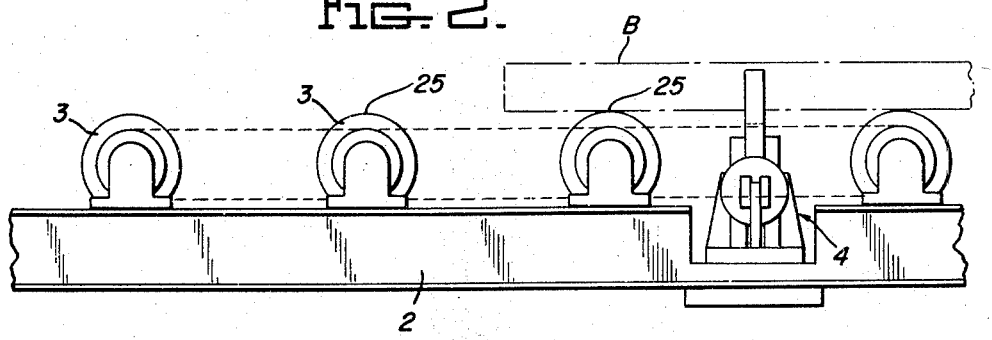
Figure 2 is a side elevation of the conveyor table and turning apparatus shown in Figure 1.
Figure 4:
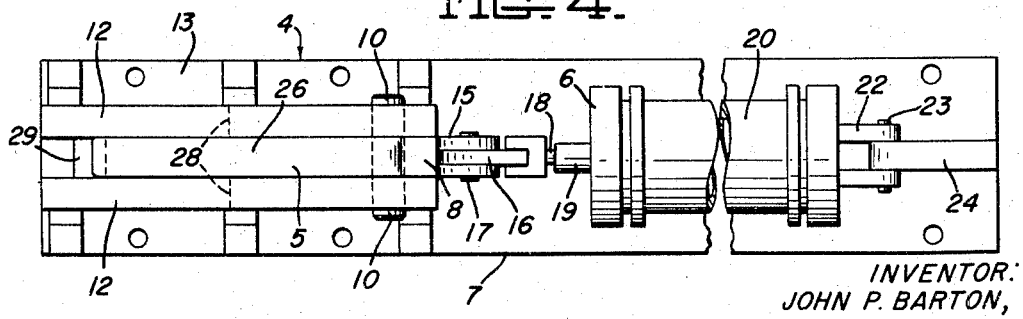
Figure 4 is a plan view of the apparatus shown in Figure 3.

Figures 1 and 2 of the drawings show a conventional runout roller conveyor table for handling work to be rolled, such as a bloom B, between successive passes of a rolling mill. It includes the usual parallel side rails 1 and 2 and conveyor rolls 3 extending transversely of the side rails. The rolls 3 furnish a conveyor support for receiving the bloom B and have a drive for rotation in a direction to deliver it to another rolling pass. The bloom or article turning apparatus of this invention is designated as a whole by the numeral 4 and is mounted between an adjacent pair of rolls 3 on which the bloom B to be turned has supporting engagement.

Generally stated, the turning apparatus 4 is comprised of three parts: a turning member 5; a double acting fluid pressure motor 6 for actuating the member 5; and a support 7 on which the member 5 and motor 6 are mounted. The relative arrangement of such parts with respect to the rolls 3 will be best understood by reference to Figures 3 and 5 wherein one of the rolls 3 is shown schematically in broken lines. From this showing, it will be noted that the turning member 5 is mounted for rectilinear movement relative to the support 7 from a normal retracted position at one end of the rolls 3, as shown in solid lines in Figure 3, to the operative turning position shown in Figure 5 and, as it moves into the latter position, a pivot means about which it may be rotated is rendered effective in a manner to be described so that it may be tilted to the position shown in dotted lines in Figure 3 to engage and turn over the billet B. These successive rectilinear and rotating movements of the turning member 5, as well as its return movement to the position shown in solid lines in Figure 3, are effected by a single operating cycle of the double acting motor 6.

The turning member 5 is fabricated from a steel plate and is shaped to provide a pair of legs 8 and 9 which are arranged in L-shaped configuration relative to each other. Its mounting on the support 7 comprises a pair of trunnions 10 projecting in opposite directions from the member 5, trackways 11 in which the tunnions 10 are received for sliding movement between the ends thereof, and an extensible actuating linkage which includes the motor 6. The trackways 11 are slots formed in spaced vertical side plates 12 which are secured to a horizontal base plate 13. An actuating arm 14 projects downwardly from the trunnions 10 and is bifurcated at its lower end 15 to provide a space for the reception of a connecting link 16. The link 16 pivots about a connecting pin 17 which extends transversely of the bifurcations 14 and has a connection at 18 with the outer end of a piston rod 19 projecting from one end of the motor 6. The motor 6 has a cylinder 20 and a piston 21 for operating the rod 19 to and from an extended position with respect thereto and is provided with conventional fluid pressure supply conduits and reversing valve mechanism (not shown) for effecting a power operation of the piston 21 in opposite directions along its length to move the rod to and from extending positions with respect to the cylinder 20. The mounting of the motor 6 on the base 7 is provided by a pair of lugs 22 which project from the other end of the cylinder 20 and are connected by a pivot 23 to the upper end of a supporting lug 24 which is secured to and extends vertically from the base plate 13. The pivot 23 provides for rocking movement of the motor cylinder 20 about a horizontal axis extending transversely of the path of movement of the member 5 during its operation by the motor 6. The parts including the motor 6 between the pivots 23 and 17 thus constitute an extensible linkage for actuating the member 5 in a manner to be described and completes its mounting on the support 7.

The turning apparatus 4 is assembled in operative position with respect to a conveyor table as shown in Figures 1 and 2 with the base plate 13 extending transversely of the conveyor table side rails 1 and 2 and with the turning member 5 arranged centrally between and parallel to the axes of a pair of conveyor rolls 3. With the apparatus 4 assembled in this manner, its turning member normally occupies an inoperative retracted position relative to the rolls 3 at one side of and adjacent the conveyor side rail 2. In this retracted position of the turning member 5, as best shown in Figure 3, its leg 8 extends vertically above the tops 25 of the rolls 3 but is positioned to one side and out of the path of movement of an article or bloom B over the rolls 3, and its leg 9 extends horizontally with its upper surface 26 arranged below the roll tops 25 and thus out of the path of movement of articles thereover.

As explained above, the motor 6 constitutes part of an extensible linkage for operating the member 5 to turn over a bloom B supported on the conveyor rolls 3. Since it is double acting, each cycle of its operation is effective to move the piston rod 19 from the retracted position shown in Figure 3 to an extended position and to then return the rod 19 to its retracted position, the member 5 being operated in a manner to be described to turn over a bloom B by movement of the rod 19 to its fully extended position. During initial movement of the rod 19 toward its extended position, the member 5 is moved rectilinearly from the position shown in Figure 3 to the position shown in Figure 5, the trunnions 10 sliding through the slots 11 during this movement and the length of such movement being determined by the spacing of the ends 27 and 28 of the slots 11. As the member 5 is moved in this manner, its horizontal leg 9 slides over a bar 29 extending between the side plates 12 which acts as a stop to prevent downward pivotal movement of the member 5 and the vertical leg 8 acts as a pusher bar for moving a bloom B over the rolls to a position centrally of the rolls 3 as shown in Figure 5 in which it is arranged along a longitudinal center-line of the table between its side plates 1 and 2. Engagement of the trunnions 10 with the ends 28 of the slots 11 stops the forward rectilinear movement of the member 5 and renders the trunnions 10 effective as pivots for the member 5 so that final outward movement of the piston rod 19 to its fully extended position is effective to rotate the members 5 about the axis of its trunnions 10 to tilt its horizontal leg 5 upwardly to the position shown in dotted lines in Figure 3. As the arm 5 is tilted upwardly, it moves into engagement with the bloom B or the article to be turned and continued turning movement thereof is effective to tilt the bloom B to the position shown in dotted lines in Figure 3 from which it will rotate by gravity to complete its turning movement through an angle of 90°.

In addition to turning an article or bloom B on the rolls 3 in this manner, the turning member 5 operates to place it in a centered position with its axis extending along the longitudinal center-line of the conveyor table. Centering of a bloom B in this manner is accomplished in part, as explained above, by the pushing action of the leg 8 during its movement to the position shown in Figure 5. This movement of the leg 8 is effective to move a bloom B to the center of the rolls 3 if it is initially supported on the roll ends adjacent the side rail 2 as viewed in Figure 1. If the bloom B is initially supported on the rolls 3 adjacent the side rail 1, the horizontal leg 5 will engage and elevate the bloom until the angular slope of its surface 26 is such that the bloom will slide downwardly to the position shown in Figure 3.

After turning of the bloom B by movement of the piston rod 19 to its fully extending position, the motor 6 operates to return its piston 21 and its rod 19 to the retracted position shown in Figure 3. Initial movement of the rod 19 toward retracted position first rotates the member 5 about the trunnion 10 in an opposite direction to lower its leg 9 to a horizontal position in which it engages the stop 29. Continued movement of the rod 19 toward retracted position is thereafter effective to return the member 5 with a guided rectilinear movement to its retracted position, the trunnions 10 sliding through the trackways or slots 11 to a position in which they engage the ends 27 during this final movement.

While one embodiment of my invention has been shown and described it will be apparent that other adaptations and modifications may be made without departing from the scope of the following claims.

I claim:

1. An apparatus for turning an elongated article while supported on the rolls of a roller conveyor table comprising a member operable upon movement in one rotational direction to engage and turn said article, means mounting said member for rectilinear movement from a retracted inoperative position at one side of the table to an operative turning position adjacent the center of said table, means for stopping the rectilinear movement of said member upon movement to said operative turning position including means responsive to its movement to said turning position for providing a pivot about which it may rotate, and means for actuating said member to move it from its said retracted postion to said operative turning position and to rotate it in said one rotational direction and to thereafter rotate it in an opposite rotational direction and return it to said retracted position.

2. An apparatus for centering and turning an elongated article while supported on a pair of rolls of a runout roller conveyor table comprising a member having a pair of legs connected in L-shaped configuration and normally occupying a position with one of said legs arranged vertically at one side of said table and with the other of said legs extending horizontally inwardly between said rolls, in which position both of said legs are out of the path of movement of an article over said table, means mounting said member for rectilinear movement in a direction axially of said rolls from its said normal position to a second position in which said vertical leg is adjacent the longitudinal center-line of said table, means for stopping the rectilinear movement of said member upon movement to said second position including means responsive to its movement to said second position for providing a pivot about which it may be rotated in one rotational direction to tilt said horizontal leg upwardly to engage and turn said article, and means for actuating said member to move it from its said retracted position to said operative turning position and to rotate it in said one rotational direction and to thereafter rotate it in an opposite rotational direction and return it to said retracted position.

3. An apparatus as defined in claim 2 characterized by said actuating means comprising a double acting fluid pressure motor having a piston rod connected with said member.

4. An apparatus for centering and turning an elongated article while supported on a pair of rolls of a runout roller conveyor table comprising a member having a pair of legs connected in L-shaped configuration and normally occupying a position with one of said legs arranged vertically at one side of said table and with the other of said legs extending horizontally inwardly between said rolls, in which position both of said legs are out of the path of movement of an article over said table, a pair of trunnions connected with and projecting in opposite directions from said member, a pair of trackways on which said trunnions have sliding engagement to mount said member for rectilinear movement in a direction axially of said rolls from its said normal position to a second position in which said vertical leg is adjacent the longitudinal center-line of said table, each of said trackways having stops engageable with said trunnions upon movement of said member to said second position and cooperating therewith to provide a pivot support about which said member may be rotated to tilt said horizontal leg upwardly to engage and turn said article.

5. An apparatus as defined in claim 4 characterized by said member having an actuating arm projecting vertically downwardly from said trunnions, a piston rod having a pivotal connection with said arm at its lower end, and a double acting fluid pressure motor for moving said piston rod to an extended position to thereby move said member from said normal position to said second position and to rotate said member about said pivot support to tilt said horizontal leg upwardly and for returning said piston rod to a retracted position to return said member to its said normal position.

References Cited in the file of this patent

UNITED STATES PATENTS 1,191,920    Koelkebeck    July 18, 1916
1,267,874    Kennedy    May 28, 1918